INVENTOR
HERMAN H. FLUM
BY
Abraham Wasserman
ATTORNEY

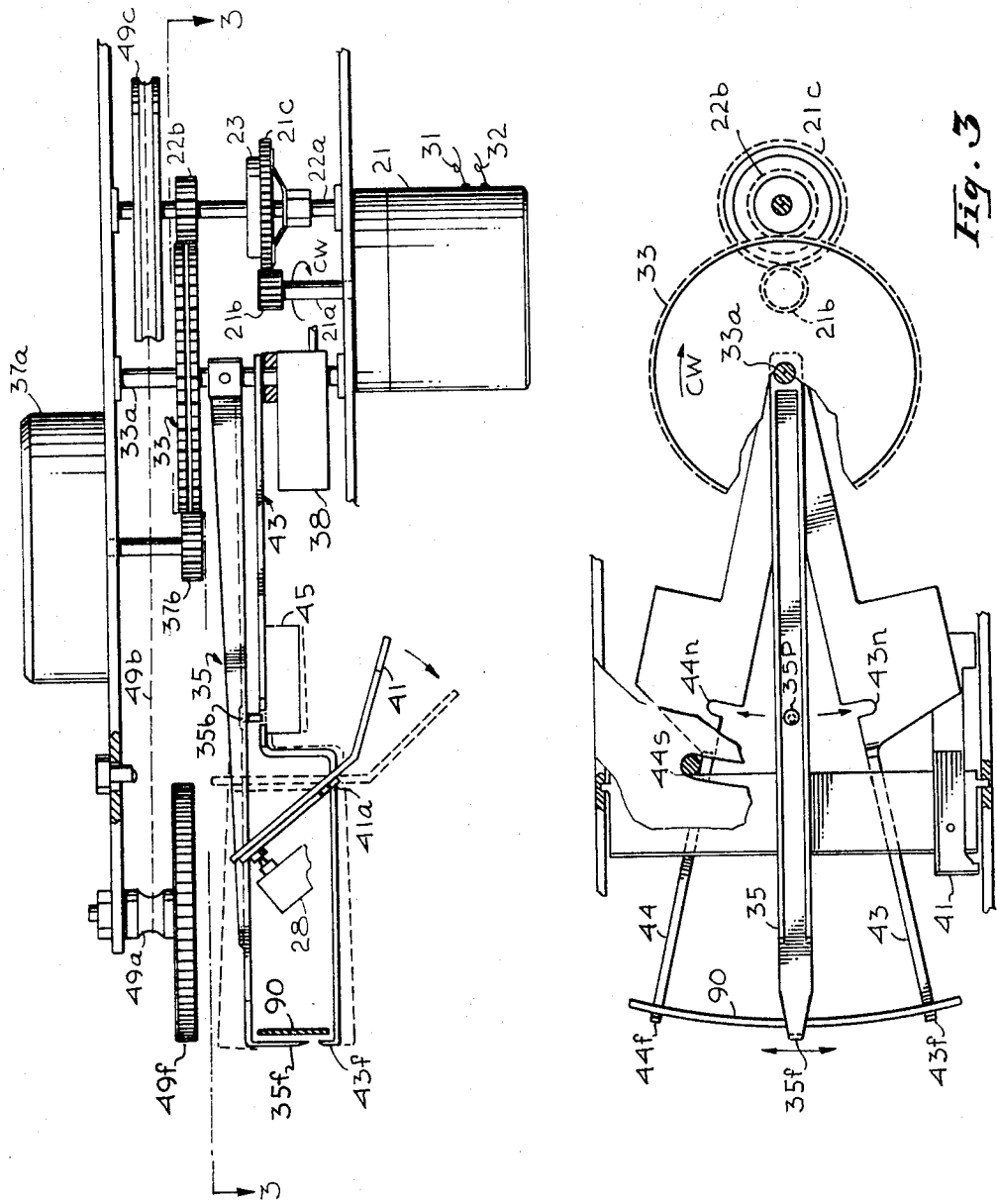

3,394,292
**ROTARY POSITION INDICATOR AND
CONTROL STATION**
Herman H. Flum, Woodland Hills, Los Angeles, Calif.,
assignor to The Bunker-Ramo Corporation, Canoga
Park, Calif., a corporation of Delaware
Filed Sept. 10, 1964, Ser. No. 395,446
13 Claims. (Cl. 318—18)

ABSTRACT OF THE DISCLOSURE

An apparatus is disclosed in which the rotary position of a first element is displayed and controlled. The first element is coupled to a second element which rotates in response to signals from a source, such as a computer. A pair of limiters, which are selectively positionable, are included to limit the rotary motion of the first element to be within a range, defined by the limiters' positions, by the engagement of a dial which is mounted on the first element with either of the two limiters. The station also includes means to bias either or both of the limiters to enable the dial to bypass them and thereby permit unimpeded rotary motion of the first element.

---

This invention relates to a system for producing analog output signals in response to manually or automatically supplied input signals. More particularly, the invention relates to a novel set point station which produces, in response to input signals from a process control computer, output signals for use in the control process. The novel set point station is also adapted to produce output signals in response to manual controls.

Since the development of high speed computing devices such as digital computers, the number of industrial processes that are controlled by such devices has constantly increased. Basically, a digital computer used for process control is connected to key subsystems or elements of the instrumentation or equipment wherein the process takes place. Each of such key elements generally includes transducing means for producing signals related to various physical conditions or forces therein. These signals are supplied as input signals to the computer, which is preprogrammed with instructions for controlling the process so as to optimize its performance. The computer, on the basis of the input signals and the pre-programmed instructions, computes the desired physical conditions or forces which should be present or take place in each of the process elemnts. On the basis of the computations, the computer supplies related signals for each of the key elements in order to control that phase of the process occurring therein.

In practice, a process control digital computer does not supply signals directly to the key elements. Rather, it supplies the signals to intermediary devices known as set point stations, each of which converts the signals supplied thereto into related analog output signals for use by each key element in the process. In order to provide safe boundaries of performance, each set point station is provided with limiting devices which prevent the station from producing analog output signals beyond predetermined limits, irrespective of the magnitude of the input signals from the computer. Such limiting devices insure that the key process elements will not be subjected to physical conditions or forces beyond those which are expected and regarded as safe in the process when operating under normal conditions. In addition, it is often desirable that each set point station produce output signals under manual control, so that an operator may be able to set the set point station to produce a desired output signal to control the key element of the process associated therewith. Being able to manually control the process is especially desirable either when initiating the process, or, while the process is being controlled by the computer, it is desired to vary the physical conditions or forces in the key element so as to further optimize or control the process. For complete flexibility in manually controlling the station, it is desirable to be able to cause the station to produce output signals even beyond the limits determined by the limiting devices associated therewith. Such flexibility enables the computer to control the key elements even beyond the limits by adjusting the parameters of the process so that eventually the physical conditions or forces occurring in each key element are again within the pre-selected limits of operation.

The present invention provides a computer controlled set point station which possesses all of the previously described advantages, and in addition provides other desirable features which contribute to the proper control of each key element of the process. The set point station of the present invention also includes visual indication means so that an operator may visually be informed at all times of the state of operation of the station. For example, the indicating means may indicate that signals are supplied from the computer, as well as indicate the characteristics of the output signals supplied from the set point station to the process element with which it is interconnected.

The present invention is based on utilizing input signals, such as may be supplied by a process control computer, to control the energization of a reversible motor which controls the rotation of an output member. The position of the output member is in turn used to produce output signals which are analogous to the input signals supplied from the computer. The rotation of the output member is selectively mechanically limited to a preselected range of rotation, thereby limiting the output signals produced as a function of the position thereof from exceeding predetermined values.

In addition, the invention provides mechanical means for bypassing the mechanical limitations placed on the rotation of the output member so that the output signals produced by the set point station are not restricted or limited, and if an operator so desires, can still be directly related to the input signals supplied from the process control computer. The set point station disclosed herein further includes manual controls so that an operator may, irrespective of the input signals from the computer, manually vary the output signals supplied by the set point station to a key element in the process with which it is associated. Mechanical and electrical switching means are also provided to prevent input signals from the computer from energizing the reversible motor when the set point station is set to operate only in a manual mode of operation.

The front panel of the set point station is provided with a dial having a plurality of markings thereon. The markings enable an operator to visually observe the characteristics or magnitude of the output signal as indicated by an output indicator as well as the relative positions of the mechanical limiters which may be physically positioned with respect to pre-selected markings of the dial. A plurality of light indicators are also provided on the front panel for visually determining various conditions of the operation of the set point station. For example, indicator lights are provided to indicate the direction of rotation of the reversible motor, namely, whether the motor is being driven in an upscale direction, or whether it is being driven in a downscale direction. An indicator light is also provided to indicate that the output signal has reached one of the preselected limiting values which occurs when the output indicator is physically constrained from further rotation by one of the mechanical limiters. In addition, the set point station disclosed herein provides for a plurality of signals, indicative of various conditions of operation therein, to be fed back to the computer. Thus, the computer constantly monitors the effect of the signals supplied by it to the set point station as well as the exact operating condition of the station. For example, the computer may be supplied with a "limits bypassed" feedback signal indicating that the output signal that the set point station may produce is not limited by the mechanical limiters described hereinbefore. Similarly, the computer may be supplied with an "at-limits" feedback signal whenever the output indicator is physically or mechanically restricted by the mechanical limiters from further rotation. The computer may also be supplied with a "mode-control" feedback signal which indicates whether the station is under computer control, or whether the output signal which the station produces is only a function of manual operation.

The novel features which are believed to be characteristic of the invention, together with further objects and advantages thereof, will be better understood from the following description taken in conjunction with the accompanying drawings, in which:

FIGURE 2 is a front view of a portion of the apparatus of the invention showing most of the mechanically interconnected elements thereof;

FIGURE 3 is a top view of a portion of the elements shown in FIGURE 2;

Figure 1:
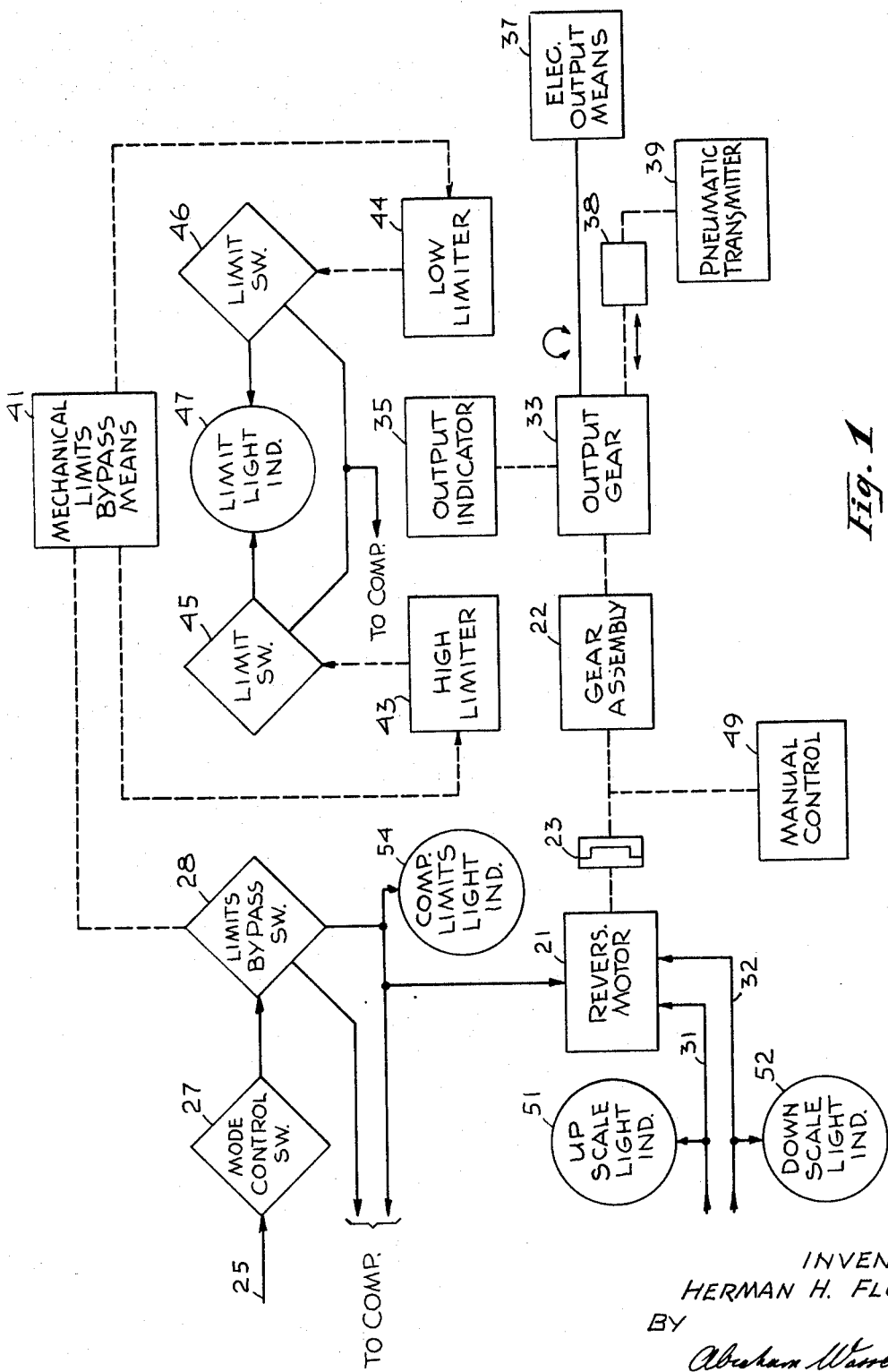
FIGURE 1 is a block diagram of an embodiment of the invention.

Reference is now made to FIGURE 1 wherein a reversible motor 21 is shown mechanically coupled to a gear assembly 22 through a clutch 23. The reversible motor is adapted to be energized by signals supplied from a process control computer by means of a pair of lines. One line is a common power line 25 which supplies the signals to the reversible motor 21 through serially connected mode control switch 27 and normally-closed limits bypass switch 28. The other line by which the signals are supplied to the reversible motor 21 may be either a line 31 or a line 32, depending on whether the motor is to be driven so as to produce rotational motion in a first direction, hereinafter also referred to as the upscale direction, or whether the motor is to be driven in a second direction opposite to the first direction, hereinafter also referred to as the downscale direction. The gear assembly 22 is mechanically coupled to an output gear 33 which is in turn coupled to an output indicator or pointer 35. The output gear 33 and the output indicator 35 rotate as a function of the rotational motion produced by the reversible motor 21. The magnitude of rotation as well as the direction of rotation of the output gear 33 and the output indicator 35 are directly related to the signals supplied to the reversible motor from the process control computer. The output gear 33 may be coupled to an electrical output means 37 so that the output thereof is made to be directly proportional to the magnitude and direction of rotation of the output gear 33. Similarly, the output gear 33 may be connected through a rotational-to-linear motion converter 38 to a pneumatic transmitter 39, so that the pneumatic output of the transmitter is made to be directly proportional to the direction and magnitude of rotation of the output gear 33. The conversion of the magnitude and direction of rotation of a member such as the output gear 33 into proportional electrical pneumatic signals is well known in the art and therefore its detailed description is deemed unnecessary.

As previously stated, signals from the computer are supplied to the reversible motor 21 by means of the line 25 through the mode control switch 27 and the limits bypass switch 28. The mode control switch 27 may be a single pole switch which may be positioned in either a computer setting or a manual setting. The signals from the computer can pass to the reversible motor 21 through the mode control switch 27 only when the latter switch is in the computer setting. Similarly, the signals from the computer to the reversible motor 21 can pass the limits bypass switch 28 only when the switch is de-energized, that is, when the switch contacts are closed. However, if the mode control switch 27 is in the manual setting previously referred to and/or the limits bypass switch 28 is energized by a mechanical limits bypass means 41 to which its is coupled, as will be explained later in greater detail, the signals from the computer to the reversible motor 21 are interrupted, thereby preventing the reversible motor 21 from producing rotational motion and affecting the position of the output gear 33.

Assume that the mode control switch 27 is in the computer setting previously referred to, and that the limits bypass switch 28 is de-energized so that signals from the computer may pass by means of the line 25 to the reversible motor 21. Further assume that the signals are supplied to the reversible motor by means of the line 31 so that the reversible motor is caused to rotate in an upscale direction. The reversible motor 21 may be of the type which produces rotational motion as a function of the duration of the signals supplied thereto; that is, it produces rotational motion for the time duration that pulses or signals are supplied thereto. On the other hand, the reversible motor 21 may be of the type which responds to the number of pulses supplied to it, rather than to their time duration. Such a motor is analogous to a stepping motor, stepping or rotating by a predetermined amount for each pulse supplied thereto. The present invention is adapted to use either type of motor, the only requisite being that the signals supplied to the reversible motor from the computer produce rotational motion of predetermined magnitude and direction as a function thereof.

From the foregoing description, it is apparent that as long as signals are supplied to the reversible motor 21 from the computer through the lines 25 and 31, the motor 21 will rotate in the upscale direction, thereby causing the output gear 33 and the output indicator 35 to rotate in the upscale direction by an amount which is a function of either the duration of the signals from the computer or the number of the pulses therefrom, depending on what type of reversible motor is being used. For explanatory purposes only, hereinafter the reversible motor 21 will be described as having a pair of windings which, when alternately energized, cause the motor to rotate in opposite directions. The motor is supplied with signals of 110 volts of alternating current (A.C.) 60 cycles per second (c.p.s.), of varying time duration, so that the amount of rotational motion produced by the motor 21 is a function of the duration of the 110 volt, 60 c.p.s. signals supplied to it.

As previously explained, it is generally desired that each set point station be provided with limiting devices for preventing the station from automatically producing analog output signals beyond predetermined amplitude limits. This prevents the key process element which is associated with the set point station from being subjected to physical forces or conditions beyond those expected or desired in normal process operations. Such limiting devices are provided in the present invention, as seen from FIGURE 1, wherein a high limiter 43 and a low limiter 44 are shown. The high and low limiters are mechanical members which may be positioned at predetermined positions in the path of the output indicator 35 so that it cannot bypass the position of either the high limiter 43 or the low limiter 44. Since the output indicator 35 is directly coupled to the output gear 33, by limiting the motion of the output indicator 35, the high and low limiters 43 and 44, respectively, limit the freedom of rotation of the output gear 33 to a range of rotation corresponding to the distance between the positions at which the two mechanical members are positioned. As a consequence, the output signals produced in response to the position or rotation of the output gear 33 are thereby limited to be within a preselected range. The high limiter 43 and the low limiter 44 have limit switches 45 and 46, respectively coupled thereto. The limit switches 45 and 46 are energized only when the output indicator 35 is in physical contact with either of the limiters with which the switches are associated. When energized, either of the limit switches 45 or 46 energizes a limit light indicator 47, thereby providing visual indication to an operator that the output indicator has reached either the high limiter 43 or the low limiter 44. This indicates that the output signal of the set point station is either at the high or low boundary or limit of the range of output signals that the set point station is to produce.

As seen from FIGURE 1, the present invention further provides a manual control 49 which is mechanically coupled to the gear assembly 22. This provides manual control of the rotational position of the gear assembly 22 and the rotational position of the output gear 33, irrespective of the rotational motion produced by the reversible motor 21 in response to signals supplied from the process control computer. For complete flexibility in the production of output signals which the set point station of the present invention may provide, the invention disclosed herein further provides a mechanical limit bypass means 41 which is adapted to mechanically prevent the high limiter 43 and low limiter 44 from restricting the motion of the output indicator 35. The mechanical limit bypass means 41 biases the limiters 43 and 44 in such a manner that the motion of the output indicator 35 is no longer restricted. As a consequence, the position of the output gear 33, which is coupled to the indicator 35, is a function only of the rotational motion produced by the reversible motor 21 or of any rotational motion that is produced by the manual control 49.

For a more complete mechanical description of the station of the invention, reference is made to FIGURE 2, wherein the reversible motor 21 is shown coupled through its shaft 21a and gears 21b and 21c to the clutch 23. The clutch is coupled to the gear assembly 22 through a shaft 22a on which gears 22b and 21c are mounted. The output gear 33, which is shown coupled to the gear assembly 22 by means of the gear 22b, is also connected to the output indicator 35 by means of a common shaft 33a. In FIGURE 2, the electrical output means 37 is shown in the form of a potentiometer 37a coupled to the output gear 33 by a potentiometer gear 37b so that the position of the sliding arm (not shown) of the potentiometer is a function of the rotation of the output gear 33. The rotational-to-linear motion converter 38 previously referred to is shown in FIGURE 2 in block form coupled to the shaft 33a of the output gear 33. The converter 38 detects the rotational motion of the output gear 33 and converts it to linear motion for producing proportionate pneumatic output signals. The manual control 49 is shown in FIGURE 2 as comprising a thumb wheel 49f which is coupled to the shaft 22a of the gear assembly 22 through a pair of pulleys 49a and 49c, intercoupled by a string or belt 49b.

From FIGURE 2, it is apparent that the rotation of the output gear 33 is a function of the rotational motion produced by the motor 21. For example, if the motor shaft 21a is rotated in a clockwise direction, as indicated by an arrow CW, it is seen that the gear 21b is rotated in a clockwise direction, causing gears 21c and 22b to turn in a counterclockwise direction (CCW). The latter gear causes the output gear 33 to turn in a direction opposite thereto, namely, in a clockwise direction. The magnitude of rotation of the gear 33 caused by the rotation of the motor shaft 21a is a function of all the gears intercoupling the two, but the direction of rotation of the output gear 33 is directly related to the direction of rotation of the shaft 21a. Since the output indicator 35 is directly coupled to the output gear 33 by means of the shaft 33a, both the magnitude and direction of rotation thereof are directly related to that of the output gear 33.

Refernce is now made to FIGURE 3, wherein the output gear 33 and the output indicator 35 coupled thereto are shown rotating or turning in a clockwise direction as indicated by the arrow CW. The output indicator is shown having a pointer or front portion 35f and a pin 35p vertically disposed with respect to the longitudinal axis of the pointer. In FIGURE 3, the high limiter 43 and the low limiter 44 having pointers or front portions 43f and 44f, respectively, are also shown. The low limiter 44 is physically positioned or fixed with respect to the plate or housing of the set point station by means of a fastening screw 44s. The limiter 43 is similarly fastened to the plate or housing by a fastening screw (not shown). The limiters 43 and 44 have opposing notches 43n and 44n, respectively, the size of the notches being sufficient for the pin 35p of the output indicator 35 to be engaged therein when the output indicator 35 is rotated so that it physically engages either of the limiters. For example, if the output indicator 35 continues to turn in a clockwise direction from the position shown in FIGURE 3, it will eventually reach the position of the low limiter 44. Thereafter it will be prevented from continuing its clockwise rotation by the pin 35p being engaged in the notch 44n whose position is fixed with respect to the housing. Once the rotation of the output indicator is restricted, it is reflected back by restricting the rotation of the output gear 33 and the gear assembly 22 which then becomes decoupled from the motor 21 by means of the slip clutch 23. The restriction of rotation of the output gear 33 in a clockwise direction results in a proportional limitation on the output signal that may be produced in response to the position thereof.

From FIGURES 2 and 3, it is apparent that even though the motor shaft 21a may continue to rotate in a clockwise direction, once the output indicator 35 is physically restrained by the limiter 44, the clockwise rotation of the armature 21 will not affect the position of the output gear 33. However, if the signals supplied to the motor 21 cause the motor to rotate in a counterclockwise direction, the output gear 33 will respond thereto and will cause the output indicator 35 to become physically disengaged from the limiter 44. If, however, the rotational motion in a counterclockwise direction continues until the pin 35p engages the notch 43n of the high limiter 43, the counterclockwise rotation of the output indicator will cease. Thus, the engagement of the pointer 35 limits the rotation of the output gear 33 and as a consequence limits the output signal which is produced as a function of the rotation thereof. In practice, the low limiter 44 and the high limiter 43 are positioned so as to enable the output gear to rotate only in a predetermined range which is directly related to the desired range of output signals. So long as the output indicator 35 is between the two limiters, the output signals are directly controlled by the signals from the process control computer. However, as soon as the output indicator is physically or mechanically limited by either of the limiters from freely rotating, the output signal does not exceed the value established by the position of the limiter irrespective of additional signals that the computer may supply. Such an output signal limiting arrangement is most significant since it prevents the set point station from producing output signals beyond predetermined limits, irrespective of the signals from the process control computer. This prevents abnormal or undesired signals from being supplied to any key element which responds to such output signals.

Under some circumstances, however, it may be desired to bypass the limiters so that the output signals of the set point station are not restricted to be within any limiting values. The present invention provides the mechanical limits bypass means 41 (FIGURES 1, 2 and 3) which, as seen from FIGURE 2, may be turned in a clockwise direction about a pivot 41a to a bias position as indicated by the dashed lines. When turned to the bias position, the mechanical limits bypass means 41 biases the output indicator 35 away from the limiters 43 and 44 so that the pin 35p cannot engage either of the notches 43n and 44n (FIGURE 3). Alternatively, the limiters 43 and 44 may be physically biased away from the output indicator 35 in order to prevent the pin 35p thereof from engaging notches 43n or 44n. In either case, however, by turning the bypass means 41 to the bias position the rotation of the output indicator is no longer restricted by the limiters 43 and 44.

The position of the mechanical limits bypass means 41 controls the limits bypass switch 28 so that, when the mechanical bypass means 41 is turned to its bias position, the switch 28 is energized; that is, its normally closed contacts are opened. As a result, the signals from the process control computer can no longer energize the reversible motor 21 as explained in conjunction with FIGURE 1. It is apparent, therefore, that whenever the limits established by the limiters 43 and 44 are bypassed, the motor 21 is disconnected from the computer if the bypass means 41 is left in its bias position.

The mechanical limits bypass means 41 may be temporarily moved to its bias position so as to permit the output indicator to move to a position outside the range between the two limiters, then the bypass means 41 may be returned to its normal position. It is apparent from the foregoing description that once the output indicator is outside the range defined by the two limiters, its movement is no longer restricted. Under such circumstances, the computer may control the rotational motion of the output indicator in either direction, since the notches 43n and 44n (FIGURE 3) only restrict the output indicator from getting out of the range between the limiters. However, once the output indicator is outside the range between the limiters, the computer may control the position of the output indicator and cause it to re-enter the limited range. For example, in the set point station disclosed herein as shown in FIGURE 3, the output indicator may be temporarily biased and rotated clockwise beyond the limiter 44. Then the indicator may be unbiased. In such a case, the computer will control the rotation of the output indicator in either direction. The rotation in a clockwise direction is unrestricted since the limiter 44 has already been manually bypassed. Rotation in a counter-clockwise direction is similarly unrestricted since the notch 44n of the limiter 44 only engages the pin 35p when the output indicator is turning in a clockwise direction. Thus the computer may cause the output indicator to re-enter the range between the limiters 43 and 44. Such an arrangement is most significant since it may often be desired not to change the settings of the limiters and yet be able to produce output signals beyond the limits established by the limiters. Likewise, it may be desirable to permit the computer to continuously control the magnitude of the output signals supplied to the key element of the process with which the set point station is interconnected.

As previously explained in connection with FIGURE 1, the limiters 43 and 44 have limit switches 45 and 46, respectively, coupled thereto. The switches 45 and 46 are positioned adjacent notches 43n and 44n, respectively. They are activated by the pin 35p of the output indicator 35 whenever the output indicator is in physical contact with their respective limiter. Whenever either the switch 45 or the switch 46 is activated or energized, a limit light indicator 47 (FIGURE 1) is energized, thereby providing a visual indication that the rotation of the output indicator 35 is physically restricted by either the high limiter 43 or the low limiter 44.

The set point station of the invention disclosed herein may further comprise additional light indicators for visual indication of various phenomena occurring therein. For example, as shown in FIGURE 1, the set point station includes an upscale light indicator 51 which is coupled to the signal line 31. The indicator 51 is energized only when the reversible motor 21 produces rotational motion in the upscale direction in response to signals supplied via the line 31. Similarly, a downscale light indicator 52, which is coupled to the signal line 32, is energized only when the motor 21 produces rotational motion in the downscale direction in response to signals supplied via the line 32. The set point station further includes a computer-limits light indicator 54 which is connected to the junction of the limits bypass switch 28 and the motor 21. The indicator 54 is energized only when signals from the process control computer may be supplied to the motor via the line 25 which, as previously explained, can occur only if the mode control switch 27 is in the computer setting and the limits bypass switch 28 is deenergized.

In addition to providing visual indication of the occurrence of various conditions in the station, the invention provides means for feeding back signals to the computer from key points in the station, so that the computer not only supplies the set point station with input signals which cause the motor 21 to produce rotational motion in either of two directions, but the computer also monitors the conditions produced or occurring therein.

Figure 4:
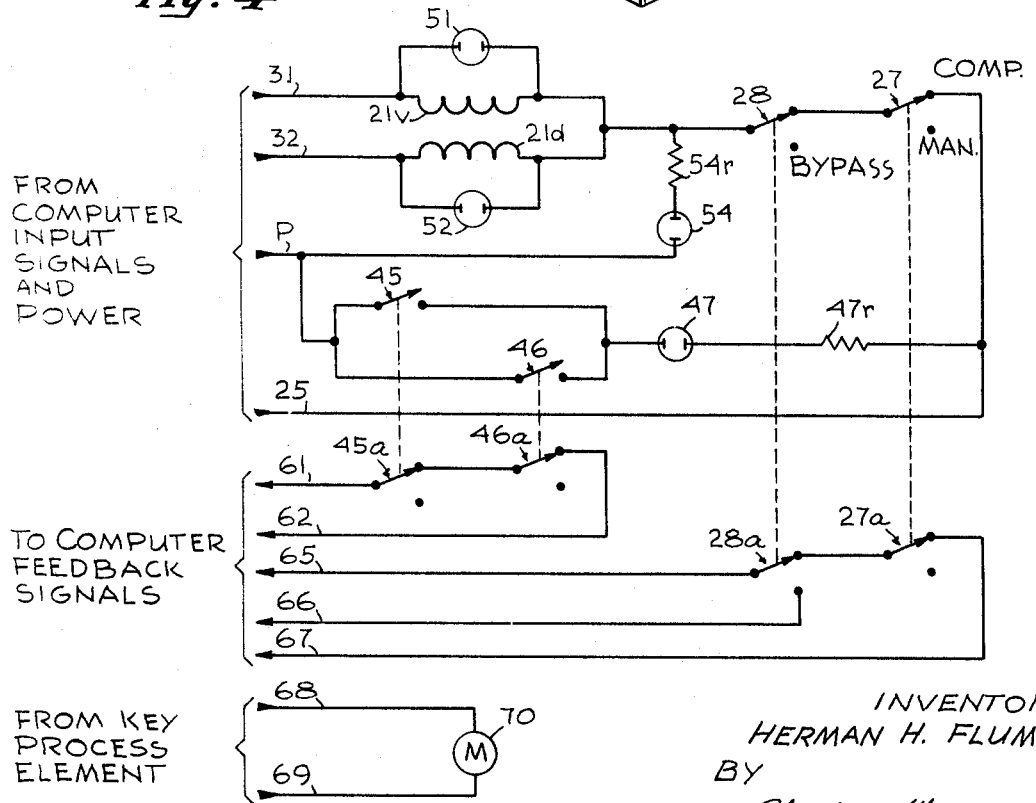
FIGURE 4 is a schematic diagram of a portion of the present invention.

Reference is now made to FIGURE 4 wherein the elements of the set point station of the present invention which produce or respond to electrical signals are schematically diagrammed. As seen therein, the reversible motor 21 includes windings 21u and 21d which are connected to the lines 31 and 32, respectively, the junction point of the windings being connected to the line 25 through the switches 28 and 27. From FIGURE 4, it is seen that power signals can be supplied to the motor 21 via the line 25 only when the switch 27 is in the computer setting and the switch 28 is in its de-energized, normally-closed state as shown. However, even if the two switches (27 and 28) are in a state as shown in FIGURE 4, whether winding 21u or winding 21d is energized to cause the motor to produce rotational motion in an upscale direction or a downscale direction, respectively, depends on whether the signals are supplied on line 31 or line 32. The winding 21u is shunted by the upscale light indicator 51 so that only when the winding 21u is energized, causing the motor to produce rotational motion in the upscale direction, is the indicator 51 energized or illuminated. Similarly, the downscale light indicator 52 connected across the windings 21d is only energized when the winding 21d is energized so as to produce rotational motion in the downscale direction. The computer-limits light indicator 54 is connected to the line 25 through a current limiting resistor 54r and the switches 28 and 27, the other terminal of the indicator 54 being connected to a second power line P. It is apparent that the indicator 54 will be energized by current through the lines P and 25 only when the switches 27 and 28 are in the state shown in FIGURE 4, namely, the mode control switch 27 is in the computer setting and the limit bypass switch 28 is de-energized.

The limit switches 45 and 46 (see FIGURES 1 and 2) are connected in parallel between the lines 25 and P through serially connected limit light indicator 47 and a current limiting resistor 47r. The indicator 47 is energized only if one of the switches 45 and 46 is closed to provide a continuous electrical path between the lines 25 and P. From the foregoing description, this occurs only when the pin 35p of the output indicator 35 is engaged in either of the notches 43n or 44n of the limiters 43 and 44, respectively. It is apparent, therefore, that the limit light indicator 47 is energized or illuminated only when the output indicator 35 is physically restricted by either of the limiters 43 and 44.

As previously stated, the set point station of the present invention may further comprise means for feeding back signals indicative of conditions in the station to the process control computer, so that the computer may constantly monitor the state of operation thereof. For example, the fact that the output indicator 35 is physically restricted by either of the limiters from freely rotating may be fed back to the computer by providing the limit switches 45 and 46 with additional contacts 45a and 46a which are serially connected between leads 61 and 62 from the computer. As long as neither of the limit switches 45 and 46 is actuated, the contacts 45a and 46a will remain in their closed states so that they provide a continuous path between the leads 61 and 62. However, as soon as either of the limit switches 45 or 46 is actuated, its respective contacts 45a or 46a open to interrupt the continuous path between the leads 61 and 62, thereby indicating to the computer that the output indicator 35 is at one of the limits.

By employing similar circuit design techniques, the fact that the output indicator 35 is physically biased by the mechanical limits bypass means 41 (FIGURES 2 and 3) may be indicated to the computer. For example, the limits bypass switch 28 associated with the bypass means 41 for biasing the output indicator may be provided with additional contacts 28a which are connected between leads 65 and 66 from the computer. As long as the switch 28 is unactuated, namely, when the output indicator is not physically biased, the contacts 28a provide an open path between the leads 65 and 66. However, as soon as the switch 28 is actuated, due to the bypass means 41 biasing the output indicator, the contacts 28a close to provide a continuous path between the leads 65 and 66 which is sensed by the process control computer. Similarly, the setting of the mode control switch 27 may be indicated to the computer by providing additional contacts 27a coupled to the switch 27 and connected on one side to the lead 65 through the contacts 28a, the other side of contacts 27a being connected to a lead 67. As seen from FIGURE 4, a continuous path between the leads 65 and 67 exists only if the contacts 28a are in their normally closed state (when the output indicator is not physically biased) and the mode control switch 27 and contacts 27a are in the computer mode setting as shown. A change in state of either the contacts 27a and 28a will interrupt the path between the leads 65 and 67, thereby indicating to the computer that either the station is in the manual mode of operation and/or that the limiters 43 and 44 have been physically bypassed.

The set point station of the present invention may further include a device such as an indicating meter 70 which is coupled by means of leads 68 and 69 to the key element of the process to which the station supplies its output signals. Such a meter 70 may provide visual indication at the set point station of the actual state of conditions or forces generated in the key element.

Figure 5:
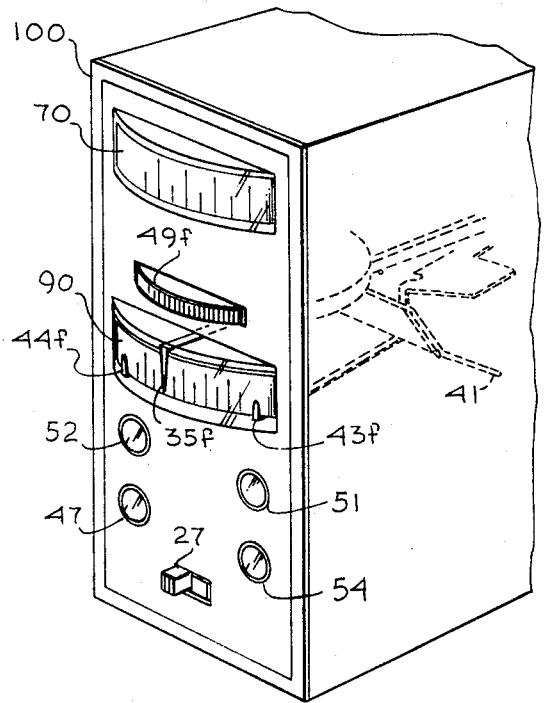
FIGURE 5 is an isometric view of the front panel of the set point station of the invention.

Reference is now made to FIGURE 5 wherein a front panel 100 of the set point station disclosed herein is shown in an isometric view. As seen therefrom, the mode control switch 27 as well as the upscale light indicator 51, the downscale light indicator 52, the limit light indicator 47 and the computer-limits light indicator 54 are mounted on the bottom half of the panel 100. A dial 90 having markings thereon is also mounted in the panel 100. The range of markings on the dial is, of course, related to the maximum range of the output signals that the station may produce. As seen from FIGURE 5, the pointers 44f, 35f and 43f of the low limiter 44, the output indicator 35 and the high limiter 43, respectively, are also seen through the front panel 100. The limiters 44 and 43 are positioned by means of their respective positioning screws 44s and 43s (see FIGURE 3). Thus, the pointers 44f and 43f are positiond with respect to the markings of the dial 90 which relate to the lower and upper limits, respectively, of the desired range of output signals. Such an arrangement enables an operator to observe at all times the magnitude of the output signal, as indicated by the position of the pointer 35f with respect to the markings of the dial 90, as well as notice the limits imposed on such an output signal. The mechanical limits bypass means 41 previously described is not positioned on the front panel 100. Rather, it is mounted in a less accessible place on the side of the station to insure that an operator does not inadvertently cause it to bias the output indicator and thereby enable the station to provide output signals beyond a range which is deemed safe.

A portion of the thumb wheel 49f of the manual control 49 (FIGURE 2) is also exposed through the front panel so that an operator may manually control the magnitude of the output signals. A set point station which also includes the meter 70 whose function was previously explained may have the meter mounted on the front panel. By viewing only the front panel an operator may thus be visually apprised of the operating state of the station as well as particular conditions occurring therein, and the effect of the output signals supplied to the key element of the process with which the station is interconnected.

From the foregoing description, it becomes apparent that the present invention provides a versatile set point station which may provide output signals in response to automatically supplied input signals. Limits may be placed on the output signals so that only signals within a predetermined range can be produced. In addition, means are provided for bypassing the limits without altering their position so that the automatically supplied signals may cause the set point station to provide output signals which are only limited by the particular means used to produce the output signals.

The set point station of the invention provides a significant degree of flexibility in that even when the station is operated in the computer mode of operation with limits imposed on the output signals, an operator may manually bypass the output indicator 35 over either of the limiters 43 or 44 and then permit the computer to control the production of output signals even beyond the limited range. However, once the output indicator rotates into a position between the two limiters, the output signals are again restricted to the preselected limited range of output signals. For example, assuming that the output indicator 35 shown in FIGURE 3 rotates in a clockwise direction, from the foregoing description it is apparent that once the output indicator 35 is mechanically limited by the limiter 44 the clockwise rotation thereof is restricted. However, by mechanically biasing the output indicator 35, it may continue to rotate clockwise beyond the limiter 44. Furthermore, the computer may control the output indicator to also turn in a counter-clockwise direction and re-enter the range between the two limiters 43 and 44 since the notches 43n and 44n only engage the pin 35p in order to limit the output indicator from rotating beyond the range defined by their position but do not prevent the output indicator from re-entering the range therebetween.

It is understood that many changes and modifications may be made by one skilled in the art without departing from the true spirit and scope of the invention.

I claim:
1. A set point station comprising:
   first means for producing rotary motion in either of two opposite directions in response to signals supplied thereto from a source of signals;
   second means including a rotatable output member coupled to said first means whereby said rotatable output member rotates as a function of the rotary motion produced by said first means;
   an output indicator coupled to said rotatable output member and adapted to be rotated therewith;
   at least one limiter for mechanically limiting said output indicator and said second means from rotating in at least a first direction beyond a predetermined point;
   manual control means coupled to said second means for manually rotating said rotatable output member;
   mode control means for interrupting the response of said first means to said signals supplied from said source so that said rotatable output member is rotatable only by manually operating said manual control means; and output means coupled to said rotatable output member for producing an output signal as a function of the position thereof.

2. A set point station comprising:

first means for producing rotary motion in either of two opposite directions in response to signals supplied thereto from a source of signals;

second means including a rotatable output member coupled to said first means whereby said rotatable output member rotates as a function of the rotary motion produced by said first means;

an output indicator coupled to said rotatable output member and adapted to be rotated therewith;

at least one limiter for mechanically limiting said output indicator and said second means from rotating in at least a first direction beyond a predetermined point;

limit bypassing means actuatable to mechanically permit said output indicator to bypass said at least one limiter so as to prevent said at least one limiter from mechanically limiting the rotation of said output indicator; and output means coupled to said rotatable output member for producing an output signal as a function of the position thereof.

3. The set point station defined by claim 2 further including electrical limits bypassing switching means responsive to actuation of said limits bypassing means for interrupting the response of said first means to said signals supplied from said source of signals.

4. A set point station comprising:

first means including a reversible motor responsive to input signals supplied thereto from a source of signals for rotating in either of two opposite directions as a function of said input signals;

second means including clutch means and an output member coupled through said clutch means to said motor for rotating said output member as a function of the rotation of said motor;

an output indicator coupled to said output member to be rotated therewith;

a dial having a plurality of visual markings thereon for indicating the relative position of said output indicator with respect thereto;

first and second limiters positioned with respect to preselected markings on said dial for mechanically limiting the rotation of said output indicator and said output member so that the position of said output member with respect to said dial is limited to the range between the preselected markings with respect to which said first and second limiters are positioned;

limit bypassing means actuatable to mechanically permit said output indicator to bypass said first and second limiters so as to prevent said limiters from mechanically limiting the rotation of said output member and said output indicator;

manual control means coupled to said second means for manually rotating said output member in either of said two opposite directions; and output means responsive to the rotational position of said output member for producing an output signal related thereto.

5. The set point station defined by claim 4 further including:

first and second electrical limit contact means coupled to said first and second limiters, respectively whereby said first electrical limit contact means is mechanically actuated when the rotation of said output indicator is mechanically limited by said first limiter and said second electrical limit contact means is mechanically actuated when the rotation of said output indicator is mechanically limited by said second limiter.

6. The set point station defined by claim 5 further including:

limit indicator means for indicating that either of said first electrical limit contact means or said second electrical limit contact means is actuated.

7. The set point station defined by claim 5 further including:

limit feedback means coupled to said first and second electrical limit contact means for supplying a limit output signal whenever said first electrical limit contact means or said second electrical limit contact means is actuated.

8. The set point station defined by claim 4 further including:

first and second indicating means coupled to said reversible motor, said first indicating means being energized when said reversible motor is rotating in a first direction of said two opposite directions and said second indicating means being energized when said reversible motor is rotating in a second direction of said two opposite directions.

9. The set point station defined by claim 4 further including:

mode control means adapted to be set in either a manual mode or source mode setting for interrupting the supply of input signals to said reversible motor when set in said manual mode setting so that said output member is rotatable only by manually operating said manual control means.

10. The set point station defined by claim 9 further including:

mode feedback means coupled to said mode control means for producing a feedback signal indicative of the setting of said mode control means.

11. The set point station defined by claim 9 further including:

electrical limits bypassing switching means responsive to actuation of said limits bypassing means for interrupting the supply of said input signals to said first means.

12. The set point station defined by claim 11 further including:

limit feedback means coupled to said electrical limits bypassing switching means for producing a feedback signal indicative of whether said electrical limits bypassing switching means is actuated by said limits bypassing means.

13. The set point station defined by claim 11 further including:

a source limits indicator for indicating that said mode control means is in said source mode setting and that said electrical limits bypassing switching means is not actuated by said limits bypassing means so that the supply of said input signals from said source to said reversible motor is not interrupted.

References Cited

UNITED STATES PATENTS

| | | | |
|---|---|---|---|
| 1,941,920 | 1/1934 | Wilhjelm | 318—265 XR |
| 1,978,947 | 10/1934 | Johanson et al. | 318—282 XR |
| 2,479,153 | 8/1949 | Buss | 318—265 XR |
| 2,841,750 | 7/1958 | Tucker | 318—282 XR |
| 3,009,087 | 11/1961 | Poulton | 318—468 XR |
| 3,263,145 | 7/1966 | Dexter | 318—266 |

BENJAMIN DOBECK, *Primary Examiner.*